United States Patent Office 3,474,756
Patented Oct. 28, 1969

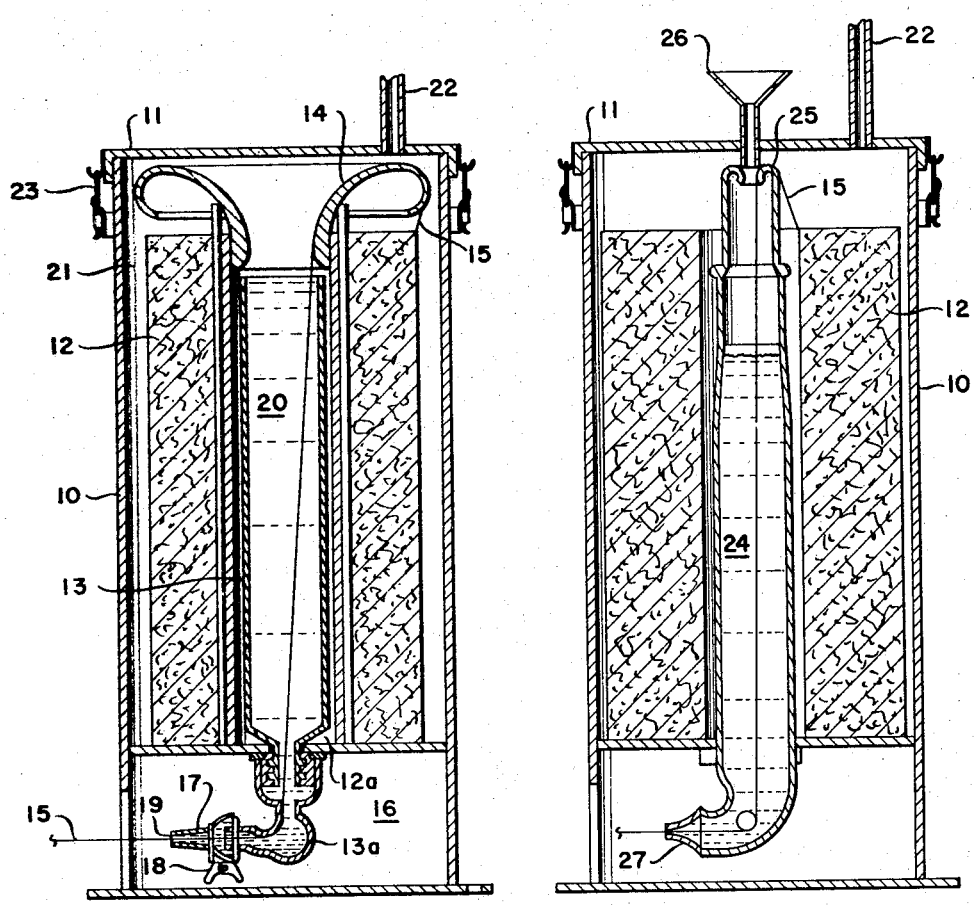
FIG. I  FIG. 2
INVENTOR:
JAN C. VAN DIJK
BY: J. H. McCarthy
HIS AGENT

3,474,756
FILAMENT IMPREGNATING DEVICE
Jan C. van Dijk, Delft, Netherlands, assignor to Shell Oil Company, New York, N.Y., a corporation of Delaware
Filed Sept. 12, 1966, Ser. No. 578,830
Claims priority, application Netherlands, Sept. 20, 1965, 6512202
Int. Cl. B05c 3/02
U.S. Cl. 118—405   7 Claims

ABSTRACT OF THE DISCLOSURE

Means to impregnate filament drawn off a reel wherein the reel core is disposed within a container and about a vertically extending reservoir. The reservoir bottom extends through the container and has a replaceable constricted opening through which the filament is drawn, while retaining impregnant, and the reservoir top extends above the reel and includes filament guide means about the periphery thereof.

---

The invention relates to the impregnation of filaments, in particular to the impregnation of glass fiber filaments, with a thermosetting synthetic resin such as a polyester or epoxy resin.

In the production of articles from glass fiber material impregnated with resin the filaments are passed from a number of reels through one or more impregnation baths filled with liquid resin, and subsequently given the shape of the article to be produced, for example by winding round a core, whereupon the resin is allowed to cure.

To this end the apparatus according to the invention comprises a container for a filament reel in which a vessel, to be filled with the impregnation liquid for the filament, is positioned at the place of the hollow core of the filament reel to be placed in the container.

The invention has the important advantage that the amount of resin in the vessel can be accurately adjusted to the amount of filament on the reel. In fact, the amount of resin in the vessel can be so chosen that when the reel is empty, the supply of resin will likewise be substantially exhausted. In this way no residues of completely or partly cured resin, which are difficult to remove, will remain behind in the vessel. The vessel can be replenished with fresh resin once a filament reel has been completely unwound and a new reel has been placed in the container. If desired, the entire container with vessel can be exchanged for another container with filament reel and filled vessel once the first reel is empty.

The invention will now be further elucidated with reference to the accompanying diagrammatic drawing. With reference to the drawing, FIGURES 1 and 2 represent two different embodiments of an impregnation unit comprising a filament reel with an impregnation vessel located therein, the whole assembly being mounted in a container.

With reference to FIGURE 1, a reel 12 with glass fiber filament is placed in a container 10. The container 10 is sealed by means of a removable lid 11 which is secured to the container 10 with draw fasteners 23. The glass fiber filament consists of a bundle of monofilaments, such as is commercially available wound in the form of hollow spools. In the axial hollow space 12a within the reel 12 is placed a vessel 13, which contains a thermosetting resin. The resin is, for example, a polyester or an epoxy resin. The resin in the vessel 13 is in the uncured liquid state, and if desired diluted with a solvent. At the beginning of the impregnation process the vessel 13 contains approximately the amount of liquid necessary for impregnating the amount of filament on the reel 12. At the top of the reel 12 a guide rim 14 is arranged for guiding a filament 15 coming from the reel 12 to the vessel 13. At the bottom end of the container 10 in a chamber 16 below the reel 12 the vessel 13 is provided with an elbow element which issues into a nozzle 17, which is removably secured to the vessel 13 by means of a clamp 18. The nozzle 17 has an outwardly tapering form, and at the end of the nozzle 17 there is an opening 19 which fits closely round the filament 15 passed through this opening so that no liquid can leak from the vessel 13 through this opening 19. The funnel-shaped constriction of the nozzle 17 promotes the explusion of air from the filament 15 as a result of the increase of pressure in the constricted part.

When the apparatus according to FIGURE 1 is in use, the glass fiber filament 15 is drawn off from the outside of the reel 12, passed via the guide rim 14 into a liquid bath 20 in the vessel 13, and led downwards through the bath 20. The filament 15 finally leaves the bath 20 at the bottom end of the vessel 13 through the opening 19 of the nozzle 17. When the filament 15 is moving through the bath 20, the filament is impregnated with resin, while any air which has been entrained with the filament into the bath escapes upwards out of the filament and out of the bath. The impregnated filament 15 is subsequently drawn off sideways out of the container 10 and is wound in a known manner in one or more layers round a cylindrical core in order to produce tubular or other articles from the filament. The nozzle 17 is normally manufactured from glass, but (to ensure a close fit) round the filament 15, even when there are slight variations in the thickness of the filament, the nozzle 17 or the edges of the opening 19 can be made from an elastic material, for example rubber. To pass a new filament 15 through the opening 19, the nozzle 17 is removed from the vessel 13 before the latter is filled with resin. The new filament passed through the vessel 13 can then be easily inserted, from a short distance away, through the narrow opening 19 of the nozzle, whereupon the nozzle 17 is then refastened to the vessel 13. The vessel can subsequently be filled with resin. The filament 15 is unwound from the reel 12 and passed through the bath 20 by drawing off the impregnated thread 15 as it leaves the opening 19, for example by means of a rotating winding element, or by rotating the entire apparatus of FIGURE 1 round a winding element.

If desired, the pressure of the liquid bath 20 can be controlled, and for this purpose a chamber 21 of the container 10, in which chamber the bath 20 is situated, can be sealed in an airtight manner, and a connection 22 for a compressed air line or a vacuum line is provided in the lid 11, which can be secured to the container 10 in an airtight manner. Once the reel 12 has been completely unwound, the lid 11 of the container 10 is removed by unlocking the draw fasteners 23 and a new reel is placed in the container. The new filament 15 is connected to the last end of the filament from the previous reel, and the impregnation process can be contained once the vessel 13 has been replenished with resin. If desired, it is naturally also possible to replace the whole impregnation unit with reel and liquid bath by a new unit.

The embodiment of the impregnation unit as shown in FIGURE 2 is substantially identical with that shown in FIGURE 1. One important difference, however, is the shape of the vessel 24, which is provided at its upper end with a guide rim 25. The outside diameter of the guide rim 25 is smaller than the inside diameter of the reel 12, so that the filament 15 can be unwound from the inside of the reel 12 without any difficulty. Unwinding the filament from the inside of the reel instead of from the outside of the reel makes possible a somewhat compacter design of the impregnation unit. Naturally the filament can only be unwound from the inside of the reel if there is no bobbin or spindle in the reel 12. In addition, a hopper 26 is incorporated in the lid 11 for filling the vessel 24 with resin. If, in order to increase the pressure on the resin bath, a compressed air line is connected to the connection 22, the hopper 26 is sealed by a lid. The nozzle 27 of the vessel 24 is also somewhat modified in shape as compared with the nozzle 17 in FIGURE 1. Otherwise, the mode of operation with the impregnation unit shown in FIGURE 2 is identical with that used in FIGURE 1.

If the nozzle at the bottom of the vessel is removable, the impregnation unit can be used for filaments having various thicknesses by securing to the vessel a nozzle having the desired opening. Moreover, in this case the nozzle can easily be replaced by a new nozzle in the event of wear or fouling.

I claim as my invention:

1. Apparatus for impregnating filaments comprising:
   a container adapted to support a filament reel having a hollow core;
   a vertically extending reservoir, generally coaxial with said container and adapted to fit within the core of said filament reel disposed within said container;
   said reservoir being attached to and extending through the container bottom and the bottommost end portion thereof being constricted whereby to retain impregnating stuff in the reservoir while permitting feed-through of impregnated filament; and
   the upper end of said reservoir being open and incorporating at the periphery thereof filament guide means which extends above the vertical extent of said reel and whereby filament may be drawn off said reel and guided into and through said reservoir.

2. Apparatus as in claim 1 wherein said guide means extend entirely about the periphery of said upper end of the reservoir.

3. Apparatus as in claim 2 wherein the constricted end of said reservoir comprises a removable element whereby the apparatus may be modified to treat filaments of different dimensions.

4. Apparatus as in claim 3 wherein the container comprises cover means including a conduit element therewith whereby to communicate said container with a fluid pressure source.

5. Apparatus as in claim 3 wherein the outside diameter of said guide means is larger than the outside diameter of said filament reel.

6. Apparatus as in claim 4 wherein the outside diameter of said guide means is of a smaller diameter than the inside diameter of said filament reel.

7. Apparatus as in claim 1 wherein the constricted end of said reservoir comprises a removable element whereby the apparatus may be modified to treat filaments of different dimensions.

References Cited

UNITED STATES PATENTS

| 1,560,575 | 11/1925 | Hohmann | 57—35 |
| 2,135,088 | 11/1938 | Meyer. | |
| 2,409,523 | 10/1946 | Adams | 184—15 X |
| 3,159,962 | 12/1964 | Franzen | 57—35 X |
| 3,222,857 | 12/1965 | Keyser | 57—35 |
| 3,295,305 | 1/1967 | Nimtz | 57—35 X |

FOREIGN PATENTS

| 636,046 | 2/1963 | Belgium. |
| 776,157 | 2/1934 | France. |
| 1,018,440 | 1/1966 | Great Britain. |

OTHER REFERENCES

Hamel: Ger. app. No. 1,136,251, pub. September 1962, class 57, subclass 35.

MORRIS KAPLAN, Primary Examiner

U.S. Cl. X.R.

57—35; 184—15